(12) United States Patent
Chen et al.

(10) Patent No.: US 6,487,170 B1
(45) Date of Patent: Nov. 26, 2002

(54) PROVIDING ADMISSION CONTROL AND NETWORK QUALITY OF SERVICE WITH A DISTRIBUTED BANDWIDTH BROKER

(75) Inventors: Shenze Chen, Cupertino, CA (US); Norival R. Figueira, Santa Clara, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/195,348

(22) Filed: Nov. 18, 1998

(51) Int. Cl.$^7$ .......................... G01R 31/08; H04L 12/28; H04J 3/16
(52) U.S. Cl. ...................... 370/231; 370/395.2; 370/468
(58) Field of Search ................................. 370/468, 477, 370/230, 231, 235, 236, 400, 401, 410–413, 415, 419, 389, 390, 395.2, 396, 395.41, 395.51, 230.1, 232–234, 351; 709/227, 226, 229, 238, 225

(56) References Cited

U.S. PATENT DOCUMENTS

| | | | | |
|---|---|---|---|---|
| 5,687,167 A | * | 11/1997 | Bertin et al. | 370/230 |
| 5,745,694 A | * | 4/1998 | Egawa et al. | 709/225 |
| 5,884,037 A | * | 3/1999 | Aras et al. | 709/226 |
| 6,081,522 A | * | 6/2000 | Hendel et al. | 370/389 |
| 6,175,870 B1 | * | 1/2001 | Gawlick et al. | 709/227 |

FOREIGN PATENT DOCUMENTS

GB       2 331 659       5/1999

OTHER PUBLICATIONS

Network Working Group, Internet–Draft, "*Use Of Label Switching With RSVP*", Mar. 1998, pp 1–5.
Diffserv Working Group, Internet–Draft, "*Definition Of The Differentiated Services Field (DS Field) In The IPv4 and IPv6 Headers*", Oct. 1998, pp 1–15.
Internet Engineering Task Force, Internet–Draft, "*A Framework For Use Of RSVP With Diff–Serv Networks*", Jun. 1998, pp 1–17.

(List continued on next page.)

*Primary Examiner*—Kwang Bin Yao
*Assistant Examiner*—Hanh Nguyen
(74) *Attorney, Agent, or Firm*—Blakely Sokoloff Taylor & Zafman LLP

(57) ABSTRACT

A method and apparatus are provided for making admission decisions in a packet switched network, such as a Differentiated Services (DiffServ) Packet Network. According to one aspect of the present invention, admission control decisions are based upon local information. An average premium service bandwidth utilized on an output link of a network device during a predetermined window of time is calculated. A determination regarding whether to accept or reject a request for a premium service flow involving the output link is made based upon the request, a total premium service bandwidth available on the output link, the average premium service bandwidth, and bandwidth request information associated with one or more flows that have been admitted within a predetermined holding time interval. According to another aspect of the present invention, multicast flows are supported. A measure of utilized premium service bandwidth is calculated for each of the output links of a multicast-capable network device. A request for premium service bandwidth for a multicast session is forwarded onto those of the output links specified by a multicast routing protocol which have sufficient premium service bandwidth available to accommodate the request based upon the total premium service bandwidth available on the output link, the measure of utilized premium service bandwidth on the output link, and the request. For each of the output links associated with the multicast session, a link state is maintained. The link state indicates the current state of a state machine that determines the behavior of the multicast-capable network device for the corresponding output link of the multicast session. Multicast packets that are subsequently received are forwarded according to the link states associated with the output links.

16 Claims, 9 Drawing Sheets

OTHER PUBLICATIONS

Diffserv Working Group, Internet–Draft, "*A Framework For Differentiated Services*", May 1998, pp 1–22.

Diffserv Working Group, Internet–Draft, "*An Architecture For Differentiated Services*", Oct., 1998, pp 1–27.

Network Working Group, Request For Comments: 2205, "*Resource ReSerVation Protocol (RSVP) Version 1 Functional Specification*", Sep. 1997, pp 1–17.

M. Degermark, T. Köhler, S. Pink and O. Schelén, "*Advance Reservations For Predictive Service*", 5th International Workshop, NOSSDAV'95, Durham, New Hampshire, USA, Apr. 19–21, 1995 Proceedings, pp 1–15.

Atsushi Hiramatsu, "*Integration Of ATM Call Admission Control and Link Capacity Control By Distributed Neural Networks*", IEE Journal On Selected Areas In Communication vol. 9, No. 7, Sep. 1991, pp 1131–1138.

S. Jamin, S. Shenker, L. Zhang and D. D. Clark, "*An Admission Control Algorithm For Predictive Real–Time Service (Extended Abstract)*", Third International Workshop, Nov. 12–13, 1992 Proceedings, pp 348–356.

H. Ohnishi, T. Okada and K. Noguchi, "*Flow Control Schemes And Delay/Loss Tradeoff In ATM Networks*", IEEE Journal On Selected Areas In Communications, vol. 6, No. 9, Dec. 1988, pp 1609–1616.

H. Saito and K. Shiomoto, "*Dynamic Call Admission Control In ATM Networks*", IEE Journal On Selected Areas In Communication vol. 9, No. 7, Sep. 1991, pp 982–989.

R. Guérin, H. Ahmadi and M. Naghshineh, "*Equivalent Capacity An Its Application To Bandwidth Allocation In High–Speed Networks*", IEEE Journal On Selected Areas In Communications, vol. 9, No. 7, Sep. 1991, pp 968–981.

S. Chong, S. Li and J. Ghosh, "*Predictive Dynamic Bandwidth Allocation For Efficient Transport Of Real–Time VBR Video Over ATM*", IEEE Journal On Selected Areas In Communications, vol. 13, No. 1, Jan. 1995, pp 12–23.

S. Abe and T. Soumiya, "*A Traffic Control Method For Service Quality Assurance In An ATM Nework*", IEE Journal On Selected Areas In Communication vol. 12, No. 2, Feb. 1994, pp 322–331.

Internet Draft, "RSVP Diagonstic Messages", Aug. 1998, pp 1–17.

Almesberger W. et al.: "SRP: A Scalable Resource, Reservation Protocol for the Internet" Computer Communications, NL, Elsevier Science Publishers BV, Amsterdam, vol. 21, No. 4, Sep. 15, 1998.

Eriksson A: "Real–Time Services Over the Internet" ISS. World Telecommunications Congress. (International Switching Symposium), CA, Toronto, Pinnacle Group, 1997.

Zhang L. et al.: "RSVP: A New Resource ReSerVation Protocol" IEEE Network, Sep. 1993, USA, vol. 7, No. 5.

Shacham N et al: "Admission Control Algorithms for Multicast Sessions With Multiple Streams," IEEE Journal on Selected Areas in Communications, US, IEEE, Inc. New York, vol. 15, No. 3, Apr. 1, 1997.

* cited by examiner

PROVIDING ADMISSION CONTROL AND NETWORK QUALITY OF SERVICE WITH A DISTRIBUTED BANDWIDTH BROKER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise deserves all rights to the copyright whatsoever.

BACKGROUND OF THE INVENTION

1. Field of the Invention

The invention relates generally to the field of computer networking devices. More particularly, the invention relates to a method and apparatus for providing admission control and network Quality of Service (QoS).

2. Description of the Related Art

The Internet and Enterprise networks, such as Intranets and Extranets, are expected to support diverse types of traffic including voice, file transfer data, interactive multimedia, real-time video, and rich graphic images. Additionally, despite exponential growth in the number of Internet users and the corresponding increase in demand for network bandwidth, expectations about the quality and timely presentation of information received from networks are higher than ever.

It has long been recognized that increased network speed and bandwidth alone will not satisfy the high demands of today's networks. Rather, distinguished qualities of service for various applications need to be provided. The Integrated Services (IntServ) architecture and Resource Reservation Protocol (RSVP) were developed to foster growth of Quality of Service (QoS) enabled networks. RSVP is an Internet Protocol- (IP) based protocol that allows applications running on end-stations, such as desktop computers, to communicate per-flow requirements by signaling the network.

Referring now to FIG. 1, an RSVP resource reservation setup for a data flow is briefly described. For further information on IntServ and RSVP see Braden, R., Clark, D. and Shenker, S., "Integrated Services in the Internet Architecture: an Overview", Internet RFC 1633, June 1994 and Braden, R., Zhang, L., Berson, S., Herzog, S. and Jamin, S., "Resource Reservation Protocol (RSVP) Version 1 Functional Specification", RFC 2205, Proposed Standard, September 1997, respectively. In this example, an IntServ network cloud 100 includes core devices 121–125, an ingress edge device 150, and an egress edge device 160. The source of a data stream, such as sender 130, transmits a Path message downstream toward potential recipients of the data stream. The Path message causes path state information, such as information regarding the reverse path to the sender 130, to be stored in each node along the way. Subsequently, end-stations that are interested in receiving the data stream may request a specific QoS for the data stream. In this example, receiver 140 initiates resource reservation setup by communicating its requirements to an adjacent router, e.g., edge device 160. The receiver's requirements are communicated by transmitting a reservation request (Resv) message upstream toward sender 130. The receiver's requirements, e.g., desired QoS and a description of the data flow, are passed back to all intervening routers, e.g., core devices 121, 123, and 124, between the receiver 140 and the sender 130 and finally to the sender 130 itself. The Resv message causes each of the core devices 121, 123, and 124 along the path the data packets to create and maintain reservation state information. In this example, the reservation state information and the path state information are together referred to as flow state information 180. Flow state information 180 is stored in each core device on the path between the sender 130 and the receiver 140. RSVP's reliance on per-flow state information and per-flow processing raises scalability concerns in large networks. As a result, only a small number of hosts actually generate RSVP signaling.

The scalability concerns raised by the combination of RSVP and IntServ led to the development of the Differentiated Services (DiffServ) Architecture. DiffServ allows distinct levels of network service to be provided to different traffic. However, rather than storing per-flow state information on each intermediate node in the network between the sender and the receiver(s), routers within a DiffServ network handle packets on different traffic flows by applying different per-hop behaviors (PHBs) based upon the setting of bits in the TOS field of each packet's IP header. In this manner, many traffic flows may be aggregated into one of a small number of predefined PHBs, thereby allowing a reduction in the amount of processing and storage associated with packet classification and forwarding. While solving the scalability issues raised by the RSVP/IntServ combination, DiffServ fails to provide adequate guidance with regard to implementation of an admission control policy.

An allocation method suggested by the DiffServ framework will now briefly be described with reference to FIGS. 2A and 2B. One approach for performing admission control suggested by the DiffServ framework involves using a centralized bandwidth broker 210. The centralized bandwidth broker 210 has control over the entire domain and centrally handles bandwidth allocation requests. In this example, a DiffServ network cloud 200 includes core devices 221–225, an ingress edge device 250, and an egress edge device 260. A sender 230 wishing to establish a particular level of service for a data flow between it and a receiver 240 transmits an indication of its requirements to the ingress edge device 250. The ingress edge device 250 communicates the requirements to the centralized bandwidth broker 210. The centralized bandwidth broker 210 validates the request against policies, compares the request against the current allocation of bandwidth for accepted traffic, and configures the edge devices 250 and 260 with information needed to mark and shape (or police) incoming packets for the flow. Subsequently, as packets that are part of the established data flow traverse the DiffServ network cloud 200, the intermediate core devices 221–225 apply a PHB that corresponds to the DiffServ service level indicated in the packet header.

While conceptually simple, the implementation of a useful centralized bandwidth broker may be very complex. In addition, the practicality of a centralized bandwidth broker is questionable at best. For example, a centralized bandwidth broker has limited capability to handle bandwidth requests for multicast sessions. Also, one obstacle in implementing a centralized bandwidth broker is supplying complete information to the centralized bandwidth broker regarding the network topology and information regarding current allocation of bandwidth for individual paths traversing the network. In order to avoid the complexity of such a full-topology scheme, the centralized bandwidth broker 210 may conceptually view the DiffServ network cloud 200 as having a logical bottleneck equal to the weakest link 270 in the domain for any ingress/egress edge device pair. For example, because the centralized bandwidth broker 210 may not have knowledge of the network topology, it may simply condense the network topology of its entire domain of authority into a single imaginary logical link 280 that has a capacity equivalent to the weakest link 270 in the domain. A network manager may manually configure the centralized bandwidth broker 210 with this information, for example. As a result of this simplification, the network topology of FIG. 2A will be condensed to the single imaginary logical link 280 shown in FIG. 2B. While this simplification reduces the centralized bandwidth broker's admission control decision to a comparison of the new request against the current allocation of bandwidth for the imaginary logical link 280, one limitation of this scheme is that it can result in a network that is over provisioned or under utilized.

In light of the foregoing, what is needed is a more intelligent mechanism for implementing admission control policy in a DiffServ network. In particular, it is desirable to increase the bandwidth utilization for premium service beyond that provided by the weakest link.

BRIEF SUMMARY OF THE INVENTION

A method and apparatus are described for making admission decisions in a packet switched network. According to one aspect of the present invention, admission control decisions are based upon local information. An average premium service bandwidth utilized on an output link of a network device during a predetermined window of time is calculated. A determination regarding whether to accept or reject a request for a premium service flow involving the output link is made based upon the request, a total premium service bandwidth available on the output link, the average premium service bandwidth, and bandwidth request information associated with one or more flows that have been admitted within a predetermined holding time interval.

According to another aspect of the present invention, multicast flows are supported. A measure of utilized premium service bandwidth is calculated for each of the output links of a multicast-capable network device. A request for premium service bandwidth for a multicast session is forwarded onto those of the output links specified by a multicast routing protocol which have sufficient premium service bandwidth available to accommodate the request based upon the total premium service bandwidth available on the output link, the measure of utilized premium service bandwidth on the output link, and the request. For each output link associated with the multicast session, a link state is maintained. The link state indicates the current state of a state machine that determines the behavior of the multicast-capable network device for the corresponding output link of the multicast session. Multicast packets that are subsequently received are forwarded according to the link states associated with the output links.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
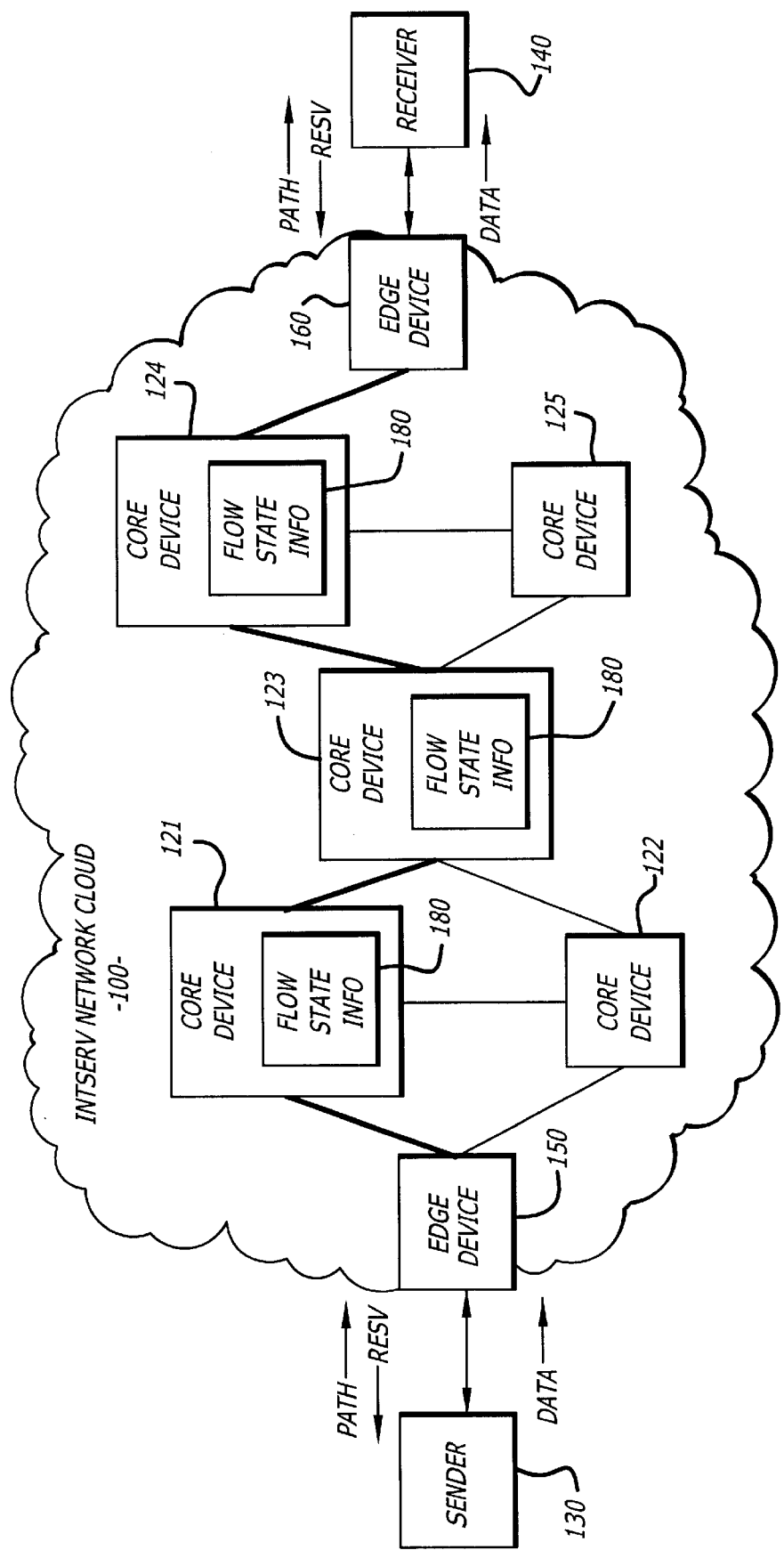
FIG. 1 illustrates resource reservation setup for a data flow using a prior RSVP/IntServ model.
Figure 2A:
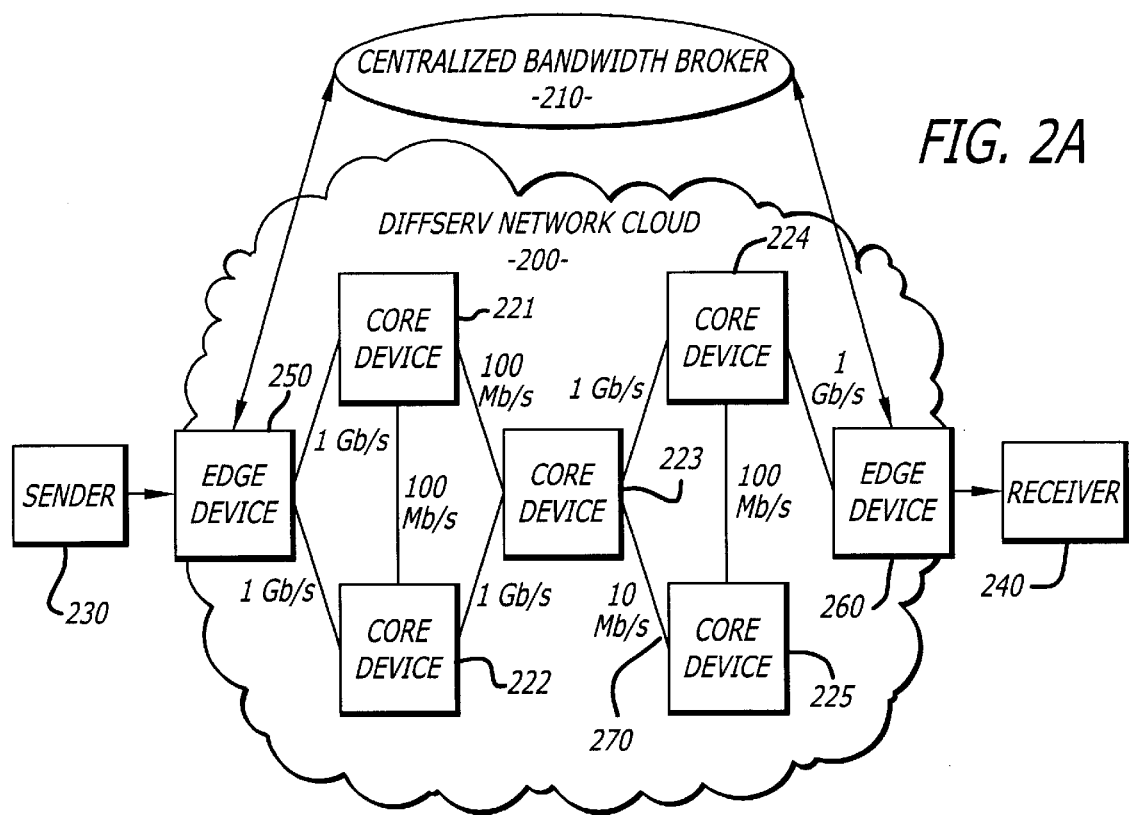
FIGS. 2A and 2B illustrate a centralized bandwidth allocation method suggested by the DiffServ framework.
Figure 2B:
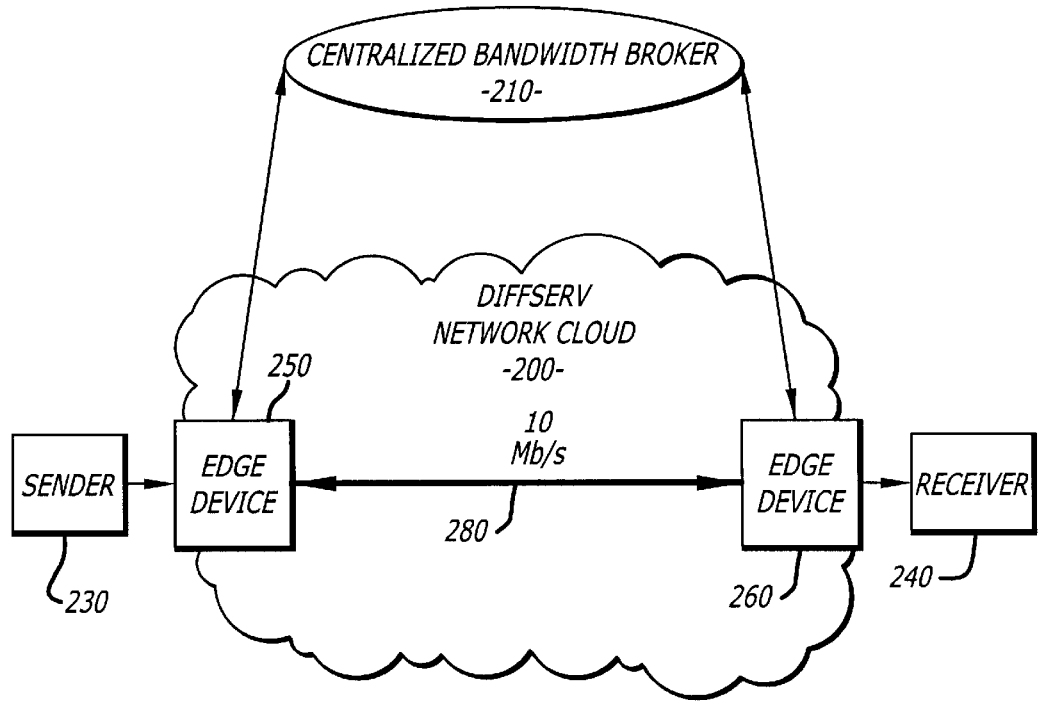

A method and apparatus are described for making admission decisions in a packet switched network based on local information. Using the teachings of the present invention, a distributed bandwidth broker may allocate premium service in a DiffServ network without keeping any permanent or soft state for accepted unicast premium service flows in core network devices. Additionally, according to one aspect of the present invention, per-flow state information is greatly reduced for multicast premium service flows by limiting per-flow storage usage to a single link state variable that can be represented with as little as two bits. According to one embodiment of the present invention, a plurality of QoS-capable network devices each include a local bandwidth broker that employs local information, such as output link bandwidth and a measure of premium service traffic utilization, to make admission decisions. Advantageously, in this manner, premium service bandwidth utilization may be increased significantly over the weakest link approach employed by a centralized bandwidth broker.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magnetooptical disks, ROMs, RAMs, EPROMs, EEPROMs, flash memory, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Importantly, while embodiments of the present invention will be described with reference to the DiffServ framework, the method and apparatus described herein are equally applicable to other packet switched network architectures that may perform traffic flow aggregation by means other than packet marking and PHBs. Furthermore, for convenience, embodiments of the present invention are described with respect to QoS-capable network devices that support two service levels: (1) best-effort, and (2) premium service; however, the method and apparatus described herein are equally applicable to QoS-capable network devices that implement other service levels and/or additional service levels.

Exemplary Network Device Architecture

Figure 3A:
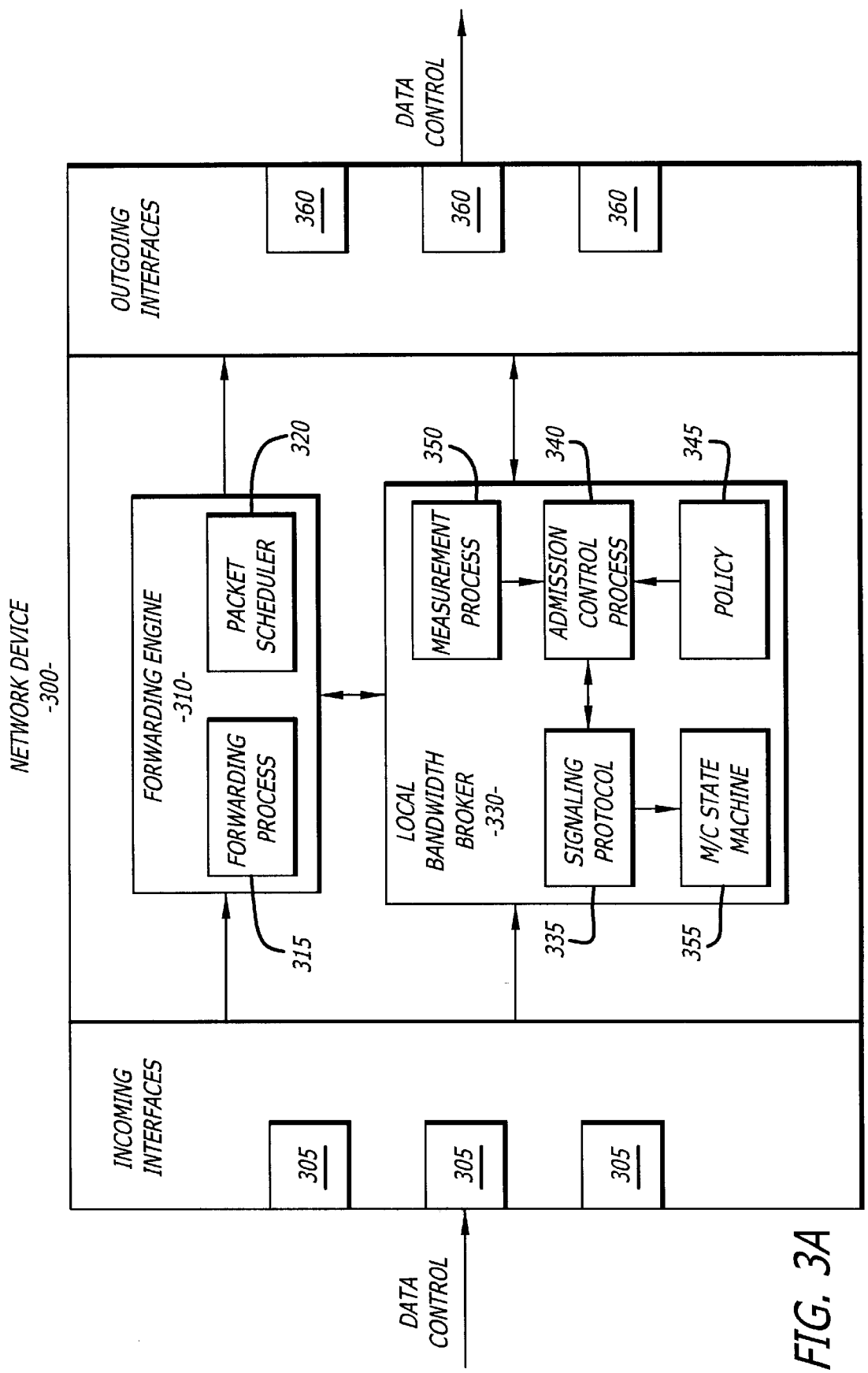
FIG. 3A illustrates the interaction of various functional units of an exemplary network device according to one embodiment of the present invention.

FIG. 3A illustrates the interaction of various functional units of an exemplary network device 300, such as a router, a routing switch, or the like, according to one embodiment of the present invention. The network device 300 is representative of an edge device that serves as an entry point into a DiffServ network cloud or a core device that resides within a DiffServ network cloud. In this example, the network device 300, includes a plurality of incoming interfaces 305 (also referred to as input links or uplinks), a forwarding engine 310, a local bandwidth broker 330, and a plurality of outgoing interfaces 360 (also referred to as output links or downlinks). In practice, additional functional units will be present in networking devices. For purposes of this example, however, only those functional units useful for providing context or for understanding the present admission control and measurement mechanisms are shown.

Data and control packets received at the incoming interfaces 305 are passed to the forwarding engine 310 and/or the local bandwidth broker 330 for processing. While, for purposes of this example, interfaces have been labeled as incoming or outgoing, the same interface may act in both the incoming and outgoing roles for different data flows in the same session.

Local bandwidth brokers 330 communicate with each other and facilitate flow establishment between senders and receivers by, among other things, generating and/or forwarding various control packets. Throughout this application, three generic types of control packets will be referred to: a REQUEST message, an ACCEPT message, and a REJECT message. REQUEST messages request the establishment of a flow by specifying the desired level of service (typically in terms of the worst-case behavior of the flow) that the sender application would like to receive in terms of a bandwidth or a token bucket filter, for example. REJECT messages indicate a device's inability to provide the requested level of service and may be sent by any node along the path between the sender and the receiver. A REJECT message may also be transmitted by the egress edge device if the receiver application (or host) does not subscribe to the flow identified by the REQUEST message. ACCEPT messages are sent by egress edge devices to indicate all devices along the path can accommodate the requested level of service. Subsequently, each of the devices will forward packets that are part of the flow with a PHB corresponding to the requested level of service. As will be described further below, repeated REQUEST messages may be used to accomodate for certain changes that may occur in a network, such as topology changes, link failures, and route changes, for example.

According to this embodiment, the forwarding engine 310 includes a forwarding process 315 and a packet scheduler 320. The forwarding process 315 may perform lookups based upon information in a packet's IP header. For example, the forwarding process 315 may determine the address of the next hop or the output link upon which the packet is to be forwarded by accessing a routing table or forwarding database (not shown). In ingress edge devices, the forwarding process 315 may additionally perform classification, marking, and shaping of premium service flows.

The packet scheduler 320 determines the appropriate PHB for received packets with reference to markings contained in the TOS field of the packet header and buffers the packets for transmission on the outgoing interface 360 specified by the forwarding process 315. As will be described further below, with regard to multicast traffic, the appropriate PHB may be determined based upon link state information stored in a modified routing table format. Two proposed PHBs are Default (DE) and Expedited Forwarding (EF). The Default PHB is designed to closely approximate the best-effort behavior of existing routers. According to the Default PHB, an incoming packet is queued at the tail of a FIFO and is serviced when the output link is free. In contrast, EF-marked packets are queued on a FIFO that is expected to be relatively short and which always gets the next opportunity to send a packet. Thus, the EF PHB may be useful for implementing services that require low delay and low jitter. For convenience, reference is made to only two service levels, e.g., premium service and best-effort. Importantly, however, the admission control and measurement mechanisms described herein are also applicable when multiple service levels are provided.

The collection of local bandwidth brokers 330 running on network devices throughout a network can be viewed as a single distributed bandwidth broker whose functionality has been divided among several devices. The local bandwidth brokers 330 of a network each independently make admission decisions regarding a particular flow based upon information local to the network device upon which they are running. In this regard, the local bandwidth brokers can be said to be peers. According to the embodiment depicted, the local bandwidth broker 330 is coupled to the forwarding engine 310 and the outgoing interfaces 360. The local bandwidth broker 330 may receive information retrieved from routing tables and/or the forwarding database from the forwarding engine 310 for use in performing its admission control processing. According to one embodiment, the local bandwidth broker 330 may update link state information in the routing tables and/or forwarding database as described further below. The local bandwidth broker 330 may also receive various statistics from the outgoing interfaces 360, such as the number of packets forwarded at a particular service level for each output link during a particular time interval. In the embodiment depicted, the local bandwidth broker 330 includes a signaling protocol process 335, an admission control process 340, an optional policy management process 345, and a measurement process 350. The signaling protocol process 335 may implement various timers and routines for handling and generating the various types of control messages. Those of ordinary skill in the art will appreciate that it may be advantageous to include an RSVP interface in the signaling protocol process 335 of edge devices in order to allow RSVP messages to trigger specific actions from the edge devices.

The measurement process 350, interfaces with the output links 360 and may perform bandwidth measurements and accumulate other statistics useful for making admission decisions. According to one embodiment, the measurement process 350 evaluates an average bandwidth utilization measurement for each output link. The average bandwidth utilization measurements may be evaluated periodically according to a predetermined evaluation interval or on demand at the request of the admission control process 340, for example.

The admission control process 340, interfaces with the signaling protocol 335 to process control messages. The admission control process 340 is responsible for verifying whether or not enough resources are available to accept new premium service bandwidth requests. As will be described further below, upon receiving flow requests, the admission control process 340 evaluates one or more admission criteria and accepts or rejects the flow. According to one embodiment, the admission control process 340 makes admission decisions based upon local information, such as output link bandwidth and a novel measure of premium service traffic utilization.

The policy management process 345 is typically included only in edge devices. The policy management process 345 interfaces with the admission control process 340 to validate requests against one or more policies. For example, scheduled requests (i.e., those for a date or time in the future) may be given preference over real-time requests (i.e., those that request the allocation of bandwidth starting immediately at the time of the request) and vice versa. Depending on the implementation, the policy management process 345 may either make policy management decisions locally or access a remote policy server for policy management decisions.

The current state of the multicast state machine 355 defines the forwarding behavior of an output link with respect to a multicast session. The current state of the multicast state machine 355 is in turn determined as a result of events, typically the receipt of control messages and/or the expiration of various timers, as will be described further below.

Importantly, the present invention is not limited to a particular implementation of these functional units. The functional units described above may be implemented with one or more logic circuits, Application Specific Integrated Circuits (ASICs), other programmable or hardcoded logic, such as FPGAs or TTL logic, a processor or other components of a programmed computer that perform a series of operations dictated by software or firmware, or a combination thereof.

Figure 3B:
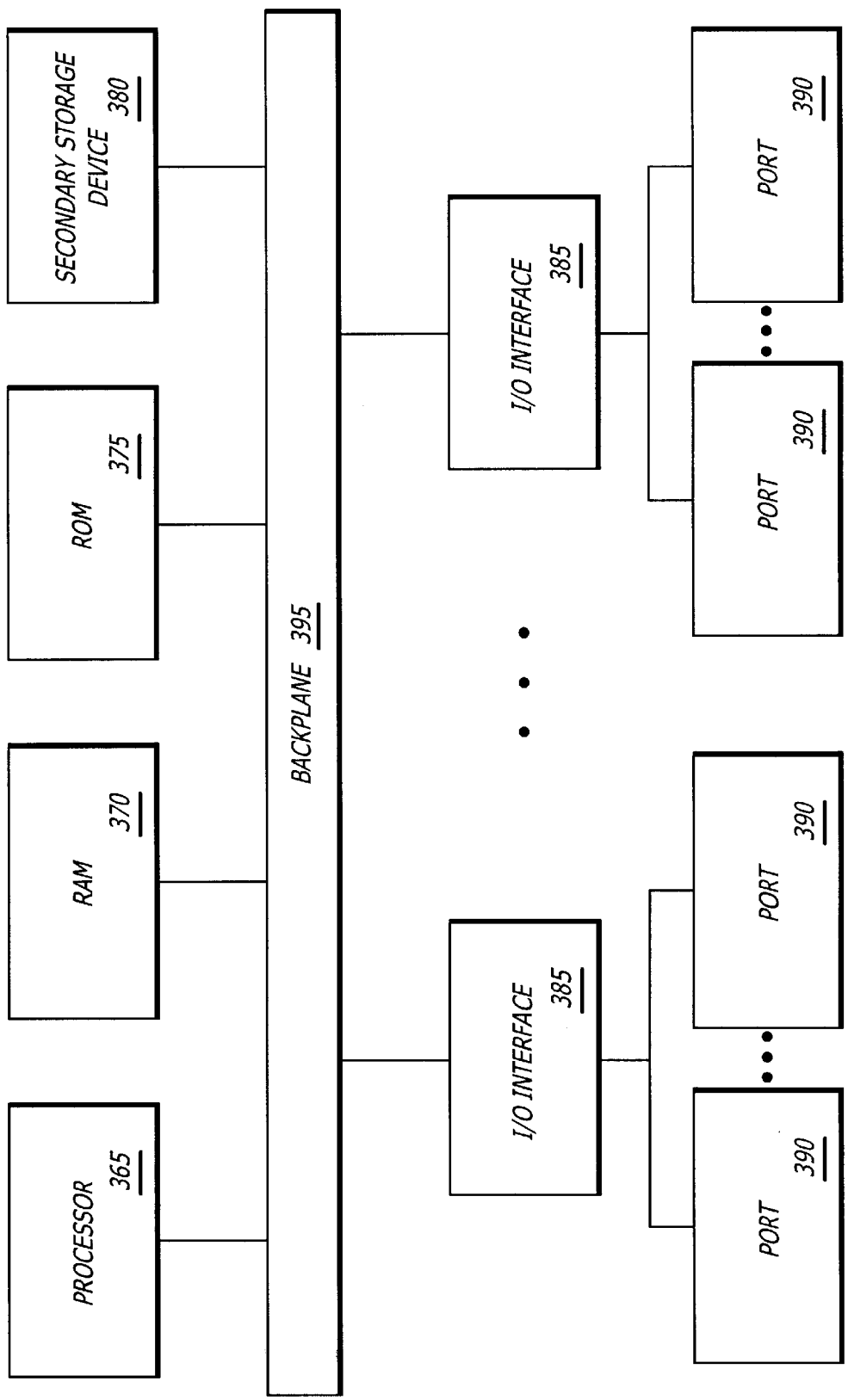
FIG. 3B is a simplified block diagram of an exemplary network device according to one embodiment of the present invention.

FIG. 3B is a simplified block diagram of network device 300 according to one embodiment of the present invention. In the embodiment depicted, the network device 300 comprises a backplane 395, such as a conventional shared backplane, switched backplane or other communication means for communicating information, and a processing means such as processor 365 coupled with the backplane 395 for processing information. The network device 300 further comprises a random access memory (RAM) or other dynamic storage device 370, referred to as main memory, coupled to backplane 395 for storing information and instructions to be executed by processor 365. Main memory 370 also may be used for storing temporary variables or other intermediate information during execution of instructions by processor 365. The network device 300 also comprises a read only memory (ROM) and/or other static storage device 375 coupled to backplane 395 for storing static information and instructions for processor 365. A secondary storage device 380, such as flash memory or a magnetic or optical disk and corresponding drive, may also be coupled to backplane 395 for storing information and instructions. The network device 300 also includes a plurality of ports 390 for communicating with other devices in a network. Typically, the ports 390 are coupled to the backplane 395 through interfaces such as I/O interfaces 385. The I/O interfaces 385 may contain a local processor, memory, and other logic (not shown) for performing segmentation and reassembly of packets, intracard forwarding and other processing. In alternative embodiments, the ports 390 may be coupled directly to backplane 395 and both intra and intercard forwarding may be provided by backplane 395.

The forwarding engine 310 and local bandwidth broker 330 processing may be performed by processor 365, by I/O processors within the I/O interfaces 385, or the forwarding and bandwidth broker functions may be distributed among the I/O interfaces 385 and processor 365.

Importantly, the present invention is not limited to any particular architectural implementation of network device 300. The simplified block diagram of FIG. 3B is intended only to illustrate one of many potential architectures in which the present invention may be employed.

Bandwidth Reservation Processing Overview for Unicast and Multicast

Figure 4:
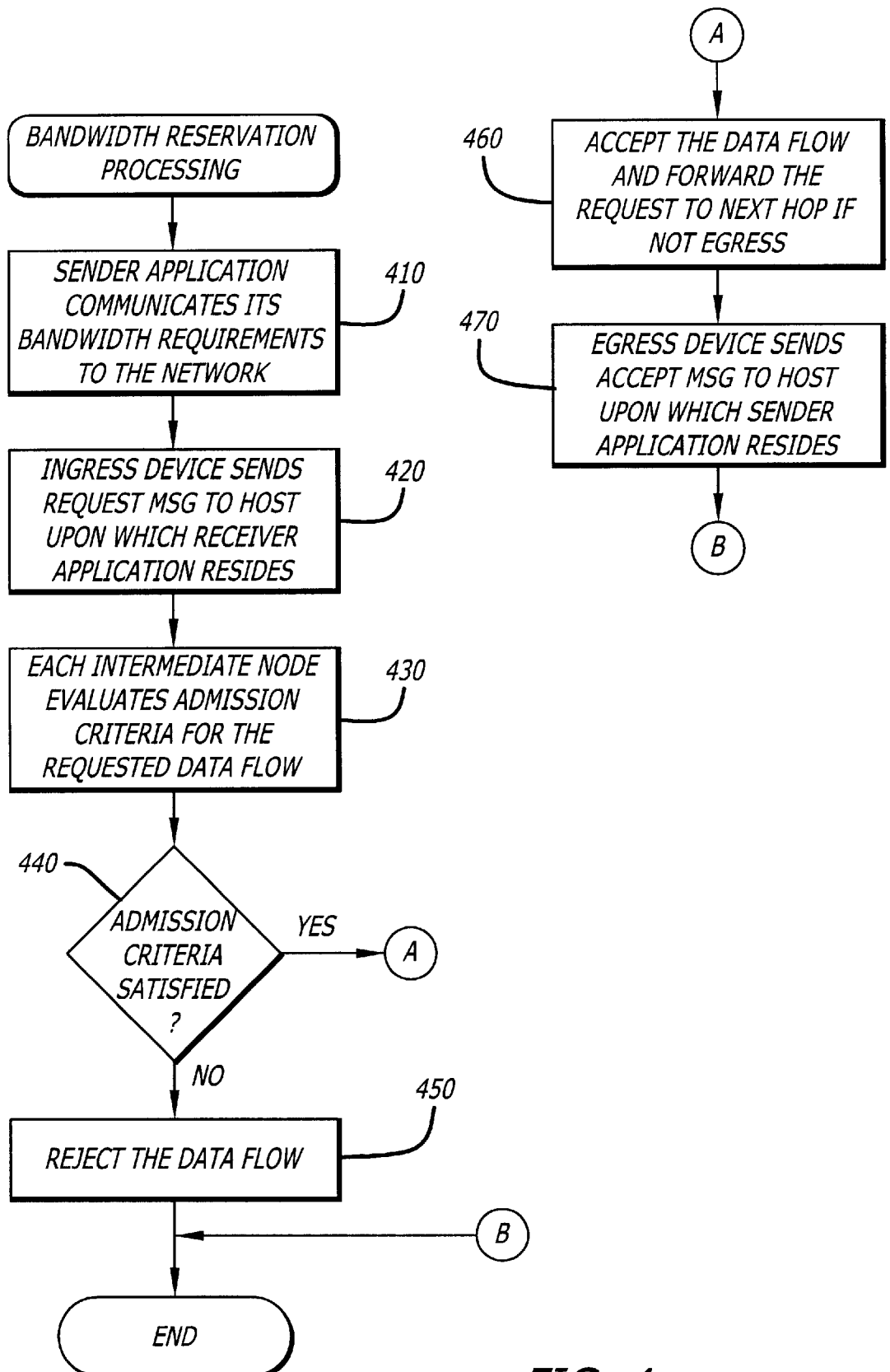
FIG. 4 is a flow diagram illustrating high level bandwidth reservation processing according to one embodiment of the present invention.

FIG. 4 is a flow diagram illustrating high level bandwidth reservation processing according to one embodiment of the present invention. Briefly, in the DiffServ framework, in order to establish a premium service flow, a request for premium service (e.g., a REQUEST message) needs to traverse the entire path of the reservation from the ingress edge device to the egress edge device. Additionally, an affirmative admission decision (e.g., an ACCEPT message) needs to be received by the ingress edge device within a predetermined timeout interval (greater than or equal to one round trip delay). Once the flow has been established, the ingress edge device may configure itself to handle the classification, marking, and shaping of the new premium service flow.

At step 410, a sender application communicates its premium service bandwidth requirements to the network. The sender application may transmit a message specifying a desired level of service in terms of bandwidth or a token bucket filter, for example, to an ingress edge device. Because flow behavior is not always static, it is common to specify the worst-case behavior of the flow.

Assuming the ingress edge device can accommodate the request, the ingress edge device sends a REQUEST message at step 420. According to one embodiment, the REQUEST message is addressed to the final destination of the premium service traffic (e.g., the host or end-station upon which the receiver application resides) rather than the egress edge device. In this manner, the egress edge device is dynamically determined by regular IP routing protocols.

At step 430, as the REQUEST message traverses the path between the ingress edge device and the egress edge device, the local bandwidth brokers running in the intermediate nodes along the path evaluate one or more admission criteria for the data flow specified by the REQUEST message and reject or accept the request.

At step 440, it is determined whether or not the one or more admission criteria have been satisfied. According to one embodiment, the admission criteria may involve evaluating a number of factors including, the total premium service bandwidth available on the output link, a measure of premium service bandwidth utilization on the output link, and the amount of bandwidth requested for the current flow. If the admission criteria are satisfied, the processing continues with step 460; otherwise processing continues at step 450.

At step 450, the requested flow is rejected. The request may be denied by any of the intermediate nodes by simply dropping the REQUEST message, thereby preventing the egress edge device from generating an ACCEPT message for this flow and causing the flow to timeout at the ingress edge device. Alternatively, a REJECT message may be sent upstream to the ingress edge device to indicate the node's inability to provide the requested level of service.

At step 460, the requested flow is accepted. According to one embodiment, a local bandwidth broker accepts a REQUEST message by simply forwarding the message to the next hop.

At step 470, the REQUEST message is received by the egress edge device. According to one embodiment, the egress edge device executes the same admission control procedures as are executed on the core network devices and the ingress edge device, except that the egress edge device does not forward the REQUEST message to the next hop. Assuming the request is accepted, the egress edge device sends an ACCEPT message back to the source of the REQUEST message (i.e., the ingress edge device). Thus, a REQUEST message is considered accepted only if all the local bandwidth brokers in the path of the message accept the request. In alternative embodiments, RSVP signaling may also be supported at the ingress and egress edge devices as will be described further below.

While in this example, requests are described as being received from an end user application, requests for premium service may be received from other sources as well. For example, a request for premium service bandwidth may be received from an intervening system, such as a service manager.

Control Packet Processing for Unicast Sessions

Figure 5:
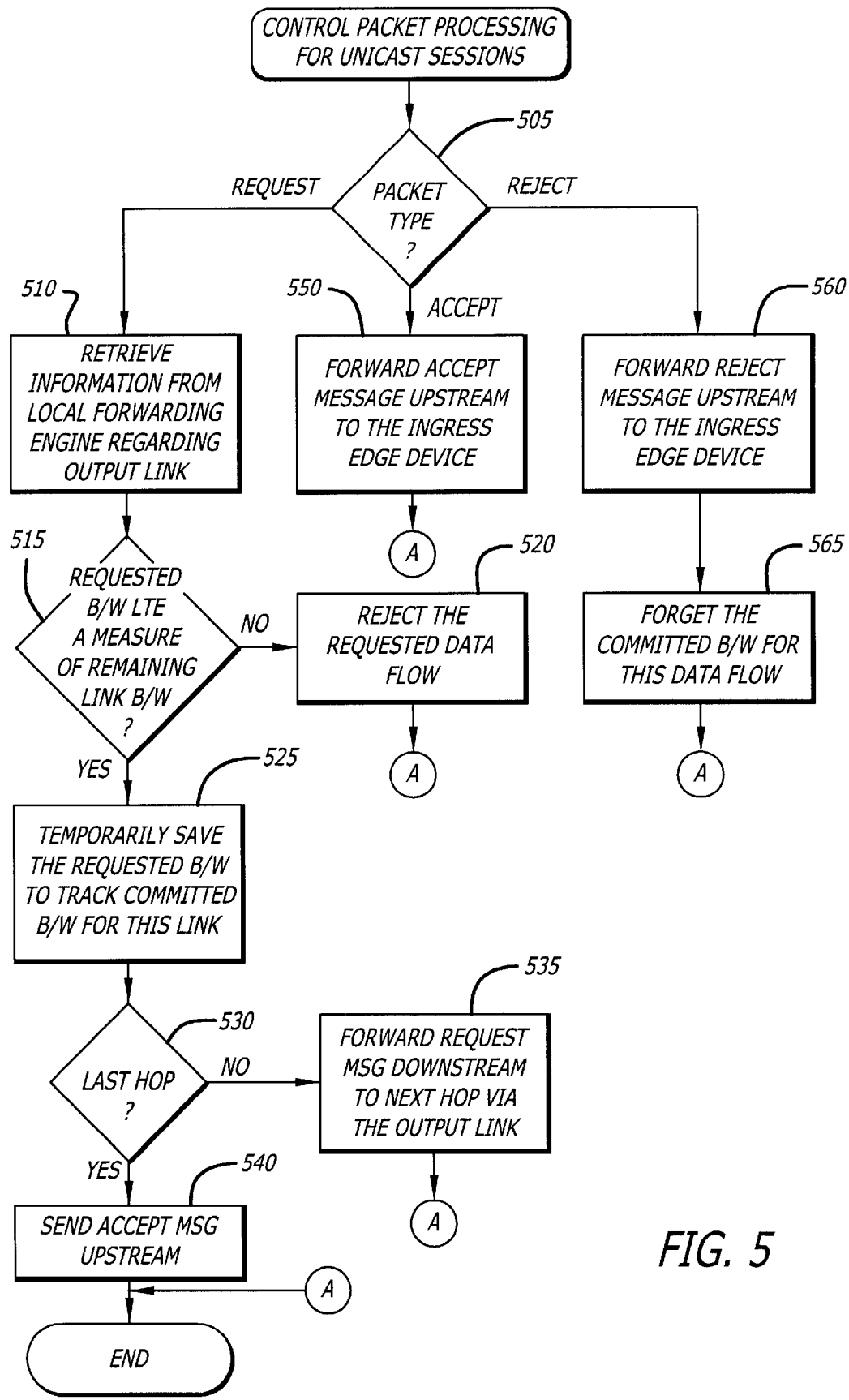
FIG. 5 is a flow diagram illustrating control packet processing according to one embodiment of the present invention.

According to one embodiment of the present invention, three basic control packets are used for flow configuration and maintenance. FIG. 5 is a flow diagram illustrating control packet processing according to one embodiment of the present invention. In one embodiment, the steps described below may be performed under the control of a programmed processor. In alternative embodiments, the steps may be fully or partially implemented by programmable or hardcoded logic. According to the embodiment depicted, at step 505, the packet type of a received control packet is determined. If the packet is a REQUEST message, then processing continues with step 510. Note that repeated REQUEST messages may be periodically generated once per repeat interval by the ingress edge device for rejected unicast flows. In this manner, a flow that was initially rejected may still have a chance to be accepted. As will become clear below, to assure that a network device will not temporarily save multiple copies of bandwidth request information for the same session, the interval of time between two consecutive (repeated) REQUEST messages should be greater than one timeout interval for REQUEST messages plus one holding time interval. The holding time interval should be greater than one round trip delay plus the interval of time that a core device takes to update its estimate of premium service bandwidth utilization. At any rate, if the packet is an ACCEPT message, then processing continues with step 550. If the packet is a REJECT message, then processing continues with step 560.

At step 510, the local bandwidth broker 330 retrieves information from the forwarding engine 310 regarding the output link. According to one embodiment, the local bandwidth broker 330 may query the forwarding engine 310 to determine an identifier associated with the output link corresponding to the next hop of the path of the reservation. The output link identifier may then be used, for example, to index into various statistics and measurements that are maintained for each output link.

At step 515, one or more admission criteria are evaluated. For example, a determination is made whether the requested bandwidth is less than or equal to a measure of remaining premium service bandwidth for the output link. According to one embodiment, the following expression is evaluated:

$$\text{req\_premium} + \text{used\_premium} \leq \alpha \times \text{total\_premium}$$

where,

| | |
|---|---|
| req_premium | is the amount of premium service bandwidth specified in the request; |
| used_premium | is the current average premium service bandwidth utilization for the output link during the predetermined window of time plus the sum of the one or more bandwidth requests that are held by the holding time interval (these bandwidth requests are associated with flows that have been admitted but may not yet have started to inject premium packets onto the output link); |
| total_premium | is the total amount of premium service bandwidth that is available for the output link; and |
| | is a utilization parameter having a value greater than 0 and less than or equal to 1. This parameter may be used to control how conservative the admission policy is. For example, it may be adjusted to balance the trade-off between premium service bandwidth utilization and the risk of over subscription |

If the admission test is satisfied, processing continues with step 525; otherwise processing continues with step 520.

At step 520, the data flow is rejected by dropping the REQUEST message, i.e., not forwarding it, and by sending a REJECT message upstream to the ingress edge device.

At step 525, committed bandwidth for the output link is tracked for use in the above utilization calculation by temporarily storing bandwidth request information (e.g., bandwidth values) associated with recently admitted flows. For example, all or part of a REQUEST message or a bandwidth value associated with a REQUEST message may be saved for a predetermined holding time interval or until a downstream node rejects the flow. Advantageously, by accounting for these newly accepted flows that cannot be instantaneously recognized in the average premium service measurements (because they have not yet started to inject premium packets onto the output link), the local bandwidth broker 330 can avoid over-admission due to the near simultaneous arrival of REQUEST messages. Importantly, REQUEST messages are stored at most for the predetermined holding time before they are discarded. Therefore, unlike RSVP, no permanent or soft state is kept in non-edge devices for unicast premium service sessions.

At step 530, it is determined whether or not this is the last hop. If it is the last hop, i.e., this network device is the egress edge device, then processing continues with step 540.

Otherwise, if this network device is a core device, then processing continues with step 535. At step 540, an ACCEPT message is sent upstream to the ingress edge device. At step 535, the REQUEST message is forwarded downstream to the next hop via the output link.

At step 550, when an ACCEPT message is received, it is forwarded upstream to the ingress edge device.

At step 560, when a REJECT message is received, it is forwarded upstream to the ingress edge device. At step 565, the REQUEST message saved for this data flow may be discarded. Alternatively, the REQUEST message may be disposed of at the expiration of the holding time interval.

Importantly, many of the steps described above need not be executed in the order shown and/or discussed. For example, step 525 may be performed on the "no" branch of step 530 before or after step 535 and additionally on the "yes" branch of step 530 before or after step 540. Additionally, the order of steps 560 and 565 may be reversed in alternative embodiments.

Measurement Processing

Figure 6:
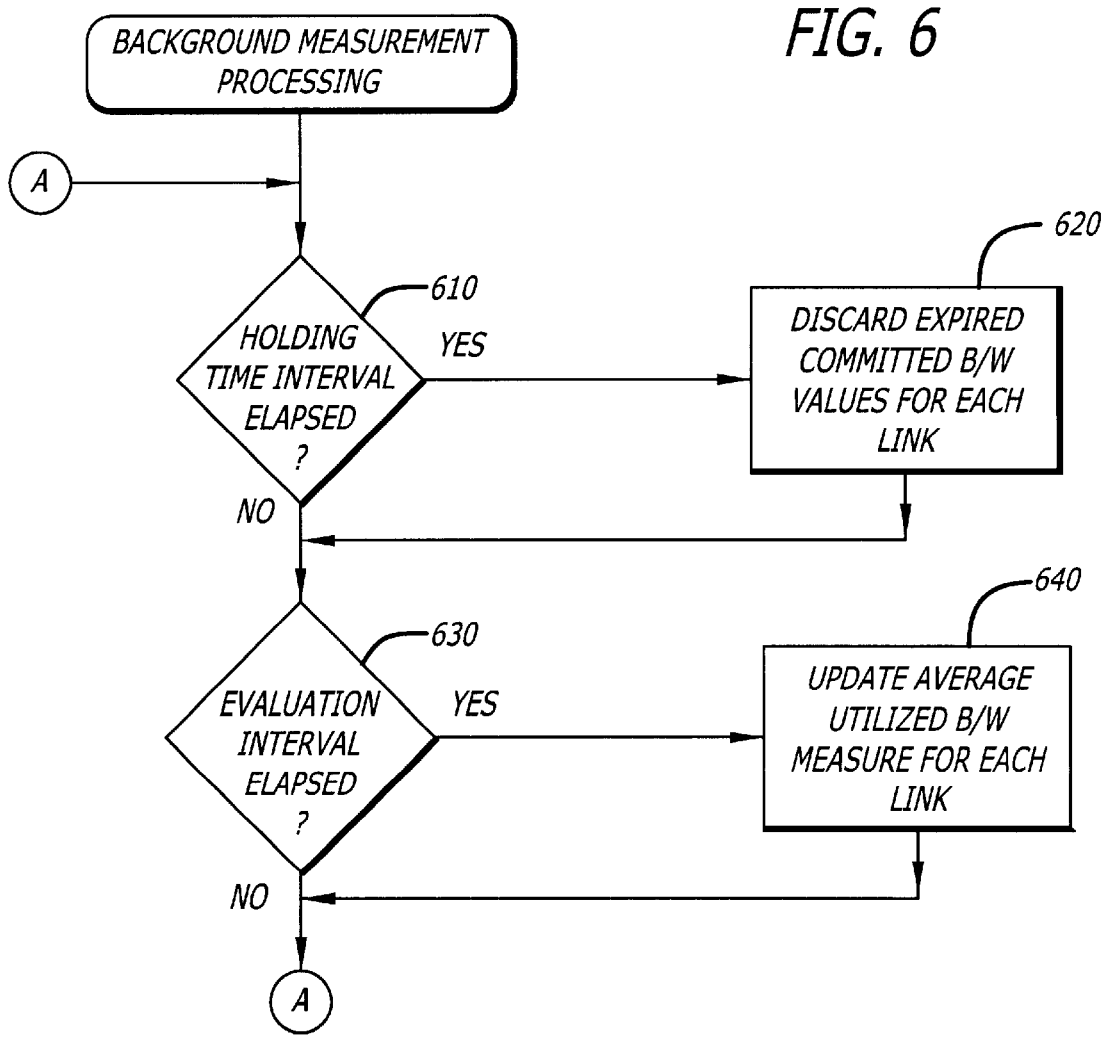
FIG. 6 is a flow diagram illustrating background processing according to one embodiment of the present invention.

FIG. 6 is a flow diagram illustrating background measurement processing according to one embodiment of the present invention. At step 610, it is determined whether or not the holding time interval has elapsed for any held bandwidth request information. If so, those of the committed bandwidth values that are expired are discarded (step 620). If the holding time interval has not elapsed or after expired bandwidth values have been discarded, at step 630, a determination is made whether or not an evaluation interval has elapsed. The evaluation interval is typically less than or equal to the time window over which the average bandwidth is calculated. At any rate, if the evaluation interval has elapsed, then processing continues with step 640; otherwise processing continues with step 610.

At step 640, the average premium bandwidth used during a predetermined time window is calculated for each link. Advantageously, the present invention's use of measured values rather than peak reservations for flows allows unicast premium service sessions to avoid maintaining permanent and/or soft state information.

Importantly, this time window measurement may be replaced with any number of other approaches. For example, in an alternative embodiment, the average bandwidth utilization measurement may be calculated as necessary upon receiving a REQUEST message. According to another alternative embodiment, the utilization measure (e.g., used_premium) may be calculated periodically at step 640 and updated when new flows are admitted. While the flow diagram gives the impression that the steps above are performed in a polling loop of some sort, it should be appreciated that the bandwidth measurement update and the discarding of expired bandwidth values may be triggered by the expiration of a timer or interrupt driven, for example.

Multicast Processing Overview

In contrast with prior techniques for providing admission control, as a result of various features of the present invention, premium IP flows may use IP multicast. In general, admission control processing for multicast sessions is as described above for unicast sessions except that it is executed separately for each output link that participates in the multicast session and a very small amount of link state information is maintained for each flow. Other variations will be pointed out below.

Briefly, the goal of admission control processing for multicast sessions is to forward premium service multicast packets as premium service traffic as long as at least one branch of a downlink sub-tree has accepted the corresponding premium service flow. Consequently, REJECT messages do not provide meaningful information for decision making in connection with multicast flows and may be dropped.

An Exemplary Multicast State Diagram

Figure 7:
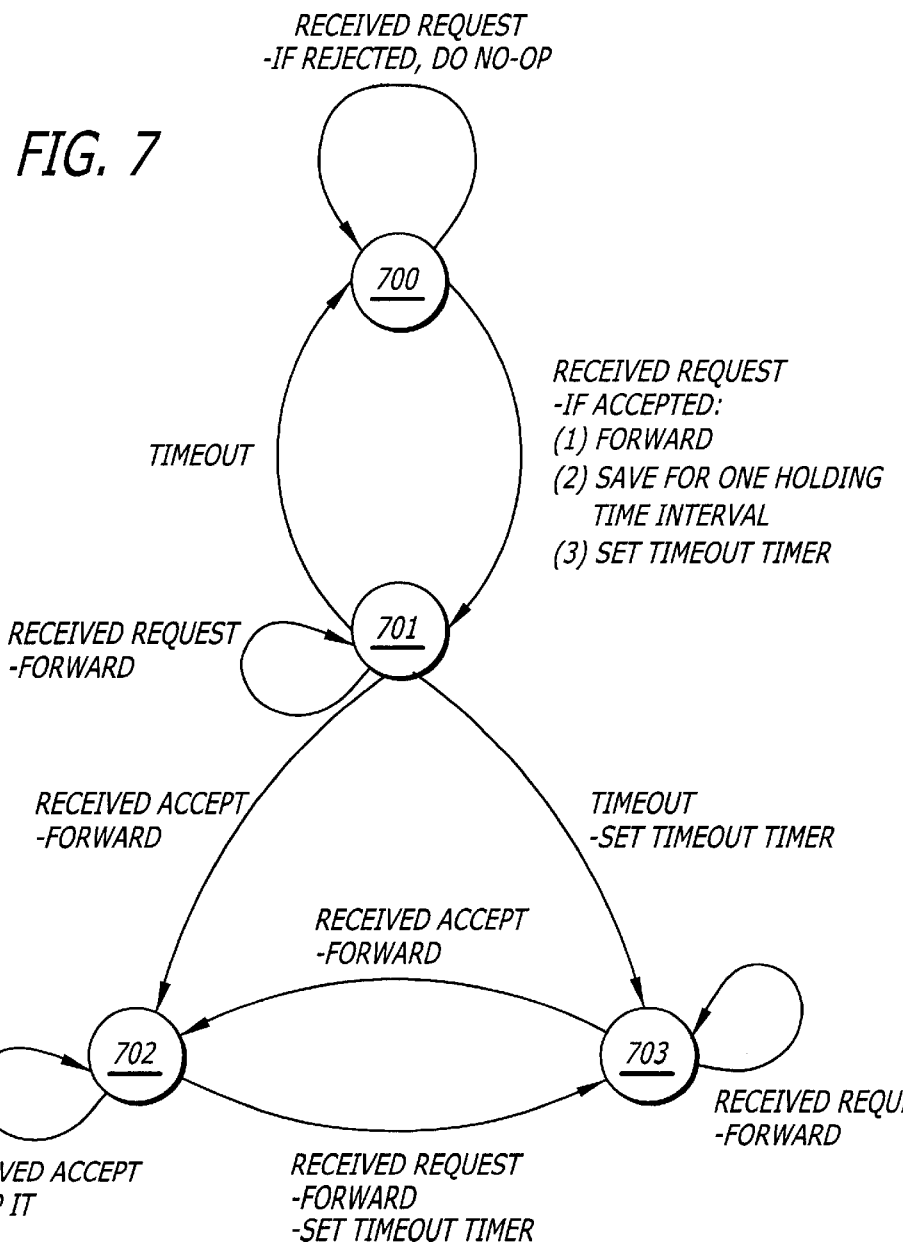
FIG. 7 is a state diagram illustrating state transitions for links associated with a multicast session according to one embodiment of the present invention.

FIG. 7 is a state diagram illustrating state transitions and actions for each link associated with a multicast session according to one embodiment of the present invention. According to the embodiment depicted, a multicast state machine includes four states: an initial state 700, a flow pending state 701, a flow established state 702, and a flow refresh state 703. All new multicast flows are initialized to the initial state 700 and link states of modified routing table entries are cleared (set to the initial state 700).

As will be discussed further below, if an output link associated with a multicast session is in the flow established state 702 or the flow refresh state 703, premium service packets are forwarded onto the output link as premium service traffic; however if the output link is in the initial state 700 or the flow pending state 701, premium service packets are forwarded onto the output link as best-effort traffic and remarked as best-effort.

Initial State 700

The initial state 700 represents a state in which the link has not accepted the particular multicast flow or in which an ACCEPT message was not timely received from the downlink sub-tree. Upon receiving a REQUEST message, the node performs the admission test described above for the output link. The REQUEST message is forwarded to the output link if the one or more admission criteria are satisfied. Additionally, bandwidth request information is saved for one holding time interval and the state machine transitions to the flow pending state 701. If the one or more admission criteria are not satisfied, the REQUEST message is dropped and the state machine remains in the initial state 700.

Flow Pending State 701

The flow pending state 701 represents a state in which the link is waiting to receive an ACCEPT message for a multicast flow that the link has recently admitted, for example. In the flow pending state 701, upon receiving an ACCEPT message it is forwarded upstream to the ingress edge device and the state machine transitions to the flow established state 702. Upon expiration of the holding time interval, the state machine returns to the initial state 700 because no ACCEPT message was received. Since new receivers may be added to the multicast tree by the multicast routing protocol, REQUEST messages may periodically be generated by the ingress edge device for multicast flows periodically upon the expiration of the repeat interval. In this manner, links that have recently become associated with a particular multicast session have a chance to execute the admission control process and update their link state thereby allowing a new downlink sub-tree the to receive premium service traffic. This periodic refresh mechanism (e.g., the generation of repeated REQUEST messages) is also useful in case ACCEPT messages are lost in the network. In any event, upon receiving a REQUEST message it is forwarded to the output link.

Flow Established State 702

The flow established state 702 represents a state in which the link has admitted the particular multicast flow and at least one ACCEPT message has been received from the downlink sub-tree. In the flow established state 702, all subsequent ACCEPT messages are dropped. Therefore, each node forwards only one ACCEPT message to the uplink for each downlink of a multicast session. In this manner, ACCEPT messages are effectively aggregated for the ingress edge device. Upon receiving a repeated REQUEST message, the REQUEST message is forwarded to the output link, a timer is set to a refresh interval, and the state machine transitions to the flow refresh state 703.

Flow Refresh State 703

The flow refresh state 703 represents a state in which the link has previously established a flow for the particular multicast session and subsequently received a repeated REQUEST message. In the flow refresh state 703, all REQUEST messages are forwarded onto the output link. Upon receiving an ACCEPT message, the ACCEPT message is forwarded onto the uplink and the state machine returns to the flow established state 702. Upon expiration of the refresh interval, the timer is set to a second chance refresh interval and the state machine falls back to the flow pending state 701. When an ACCEPT message is not received during the refresh interval this typically means one of two things, either the sub-tree is not subscribing to premium service any more or all the ACCEPT messages were lost. In either case, the flow is downgraded to best-effort by dropping back to the flow pending state 701.

As mentioned above, REJECT messages are not useful in the context of a multicast session since the acceptance of the multicast flow by even a single node underneath a downlink causes the node to forward premium service packets as premium service traffic on that output link. While REJECT messages are not necessary in the multicast context, they may still be received as a result of non-multicast nodes in the path between two adjacent multicast-capable nodes. Therefore, in any of the above states, when a REJECT message is received in connection with a multicast session it may be silently dropped by multicast-capable network devices.

An Exemplary Modified Routing Table Format

Figure 8:
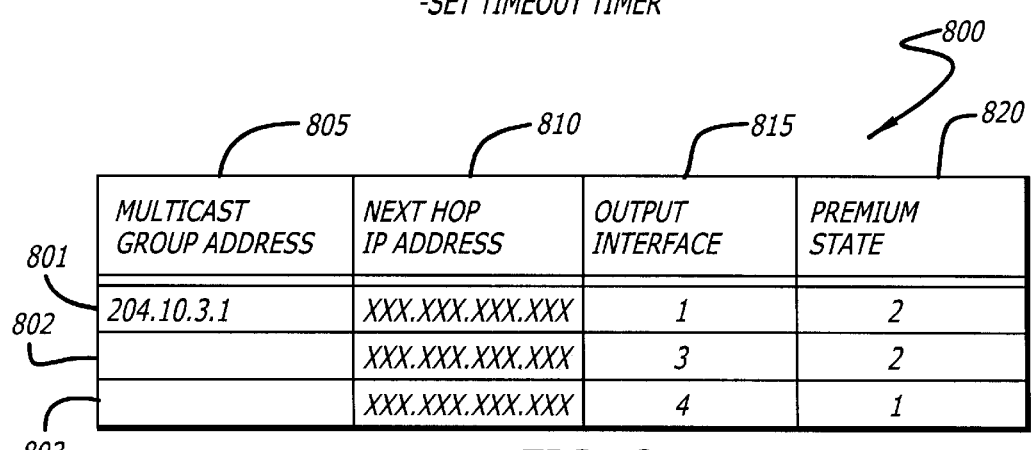
FIG. 8 illustrates an exemplary routing table format according to one embodiment of the present invention.

Depending upon the implementation, the current state of the multicast state machine for a given output link-flow pair may be stored in the local bandwidth broker 330 or in the forwarding engine 310. FIG. 8 illustrates an exemplary multicast routing table format 800 that may be used to store per-flow link state information for output links that are associated with a multicast session according to one embodiment of the present invention. According to this example, each entry 801, 802 and 803 of the modified multicast routing table 800 includes information commonly found in regular multicast routing tables, such as a multicast group address 805, an output interface 815 associated with the multicast session, and a next hop IP addresses 810 for the output interface 815. In addition, a single variable, premium state 820, is attached to each entry 801, 802 and 803. Importantly, to represent the current state of the four-state multicast state machine of FIG. 7, the storage requirement for a regular multicast routing table is only increased by two bits per entry. For example, a premium state value of zero (i.e., 00b) may indicate the current state of the corresponding output interface is state 700, one (i.e., 01b) may indicate the current state of the corresponding output interface is state 701, two (i.e., 10b) may indicate the current state of the corresponding output interface is state 702, and three (i.e., 11b) may indicate the current state of the corresponding output interface is state 703. Advantageously, the combination of the novel multicast state machine depicted in FIG. 7 and the modified routing table format 800 facilitate admission control and forwarding decisions for premium IP flows using IP multicast.

Data Packet Processing

Figure 9:
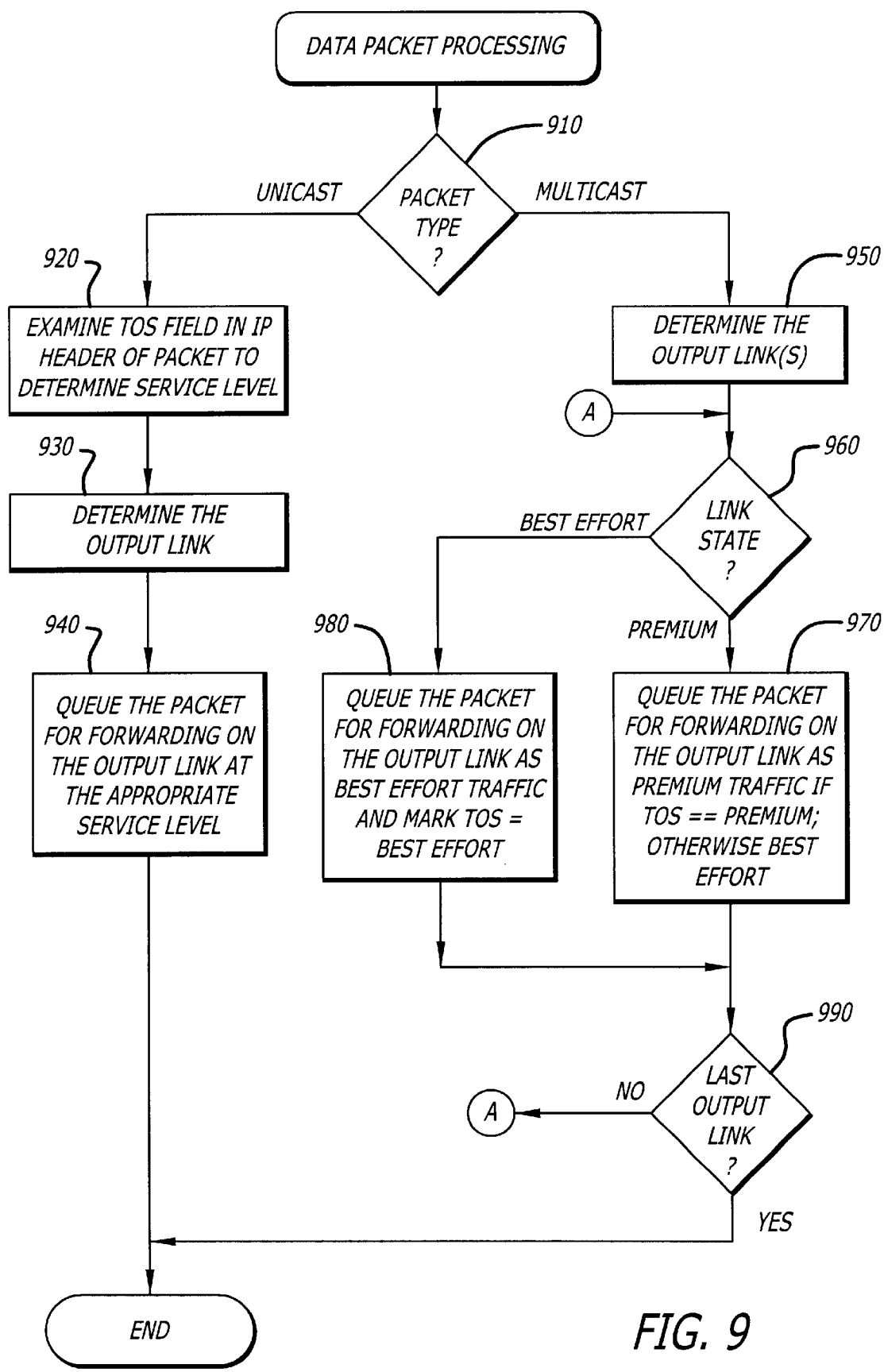
FIG. 9 is a flow diagram illustrating data packet processing according to one embodiment of the present invention.

FIG. 9 is a flow diagram illustrating data packet processing according to one embodiment of the present invention. The data packet processing generally breaks down into unicast forwarding processing and multicast forwarding processing. The unicast forwarding processing is represented by steps 920–940 and the multicast forwarding processing is represented by steps 950–990. Briefly, after classifying the data packet as either part of a unicast flow or a multicast flow, the appropriate line of processing is performed. Unicast packets are forwarded according to a service level indication in the packet header, e.g., the TOS field. Since premium multicast packets may be received when only one of several output links associated with the multicast session has admitted the multicast flow, forwarding of a multicast packet additionally includes testing the link state, e.g., premium state 820, for each of the one or more output links associated with the multicast group address specified by the multicast packet.

After receiving a data packet, at step 910, a determination is made with regard to the packet's type. If the data packet is a unicast packet, unicast forwarding processing is performed beginning at step 920. If the data packet is a multicast packet, multicast forwarding processing is performed beginning at step 950.

According to the embodiment depicted, unicast packet processing begins with step 920. At step 920, the TOS field of the unicast data packet's IP header is examined to determine the service level. At step 930, the output link upon which to forward the data packet is determined. Typically, this is accomplished by way of a routing table lookup by the forwarding engine 310, for example. Finally, at step 940, the data packet is queued for transmission at the output link according to the service level identified in step 920.

In this example, multicast packet processing starts with step 950. At step 950, a determination is made regarding the output link(s) associated with the multicast packet. For example, the multicast group address identified in the multicast packet's header may be used to access a multicast routing table. At step 960, the link state is determined for each of the output links identified in step 950. According to one embodiment, the link state may identify one of the states described with reference to FIG. 7. In alternative embodiment, more or less states may be employed. In any event, if the link state is a state in which premium service packets may be forwarded processing continues with step 970; otherwise, processing continues with step 980. At step 970, if the multicast packet is marked indicating it is to be forwarded as premium service traffic, then it is queued for transmission at the output link at that service level. However, if the multicast packet is not so marked, then it is queued for transmission at the output link as best effort traffic. At step 980, the multicast packet is queued for transmission at the output link as best effort traffic regardless of the service level indicated in the TOS field of the packet's IP header. Additionally, the TOS field is set to best-effort. According to the embodiment depicted, after the multicast packet has been queued for transmission on the appropriate output queue of the output link, it is determined at step 990 whether or not the current output link is the last output link associated with the multicast group address. If it is the last output link, then processing is complete; otherwise, processing continues with step 960 for the next output link associated with the multicast group address.

Importantly, while data packet processing of unicast and multicast packets has been illustrated and described in a particular order, there is no requirement that the steps be performed in that order. Steps that do not depend on results of other steps may be performed before, after or concurrently with one or more of those other steps. For example, the order of steps 920 and 930 may be swapped or the steps may be performed concurrently. Additionally, while the queuing of multicast packets for transmission at each of the output links associated with the multicast flow is conceptually illustrated as a loop, the queuing for each of the output links may be performed in parallel rather than sequentially.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of making admission control decisions in a packet switched network, the method comprising:

calculating an average premium service bandwidth used during a predetermined window of time on an output link of a network device; and determining whether to accept or reject a request for a premium service flow by evaluating the following expression:

$$req\_premium + used\ premium \leq \alpha \times total\_premium,$$

where, req_premium is the amount of premium service bandwidth specified in the request, used_premium is the current average premium service bandwidth utilization for the output link during the predetermined window of time plus the sum of the one or more bandwidth requests associated with flows that have been admitted but may not yet have started to inject premium packets onto the output link, total_premium is the total amount of premium service bandwidth that is available for the output link, and $\alpha$ is a utilization parameter having a value greater than 0 and less than or equal to 1.

2. The method of claim 1, wherein the network device is a multicast-capable network device and includes a plurality of output links, the method further comprising:

receiving a second request, the second request for premium service bandwidth for a multicast session;

forwarding the second request onto one or more of the plurality of output links that are associated with the multicast session as determined by a multicast routing protocol and which have sufficient premium service bandwidth available to accommodate the second request based upon a total premium service bandwidth available on the output link, a measure of utilized premium service bandwidth on the output link, and the second request;

maintaining a link state for each of the one or more output links that are associated with the multicast session, the link state indicating a current state of a state machine that determines the behavior of the multicast-capable network device for the corresponding output link of the multicast session; and forwarding packets that are part of the multicast session according to the link states associated with the one or more output links.

3. The method of claim 2, further comprising:

forwarding data packets that are part of the multicast session as best-effort traffic over those of the one or more output links having link states associated with a first state of the state machine, the first state representing a state in which the corresponding output link is waiting for an admission decision for the second request from a branch of its downlink sub-tree; and forwarding data packets that are part of the multicast session as premium service traffic over those of the one or more output links having link states associated with a second state of the state machine, the second state representing a state in which the corresponding output link has received an indication that a branch of its downlink sub-tree has accepted the second request.

4. A method of making admission control decisions in a packet switched network, the method comprising:

calculating an average premium service bandwidth used during a predetermined window of time on an output link of a network device; and determining whether to accept or reject a request for a premium service flow involving the output link based upon the request, a total premium service bandwidth available on the output link, the average premium service bandwidth, and bandwidth request information associated with one or more flows that have been admitted within a predetermined holding time interval, the determining of whether to accept or reject the request comprises accepting the request when the following expression is true and rejecting the request when it is false:

$$req\_premium + used\_premium \leq \alpha \times total\_premium,$$

where, req_premium is the amount of premium service bandwidth specified in the request, used_premium is the current average premium service bandwidth utilization for the output link during the predetermined window of time plus the sum of the one or more bandwidth requests associated with flows that have been admitted but may not yet have started to inject premium packets onto the output link, total_premium is the total amount of premium service bandwidth that is available for the output link, and $\alpha$ is a utilization parameter having a value greater than 0 and less than or equal to 1.

5. A method of making admission control decisions in a Differentiated Services Packet Network, the method comprising:

determining a measure of utilized premium service bandwidth on an output link of a network device by periodically calculating an average premium service bandwidth used during a predetermined window of time, and adding to the average premium service bandwidth a bandwidth associated with a flow that has been admitted but that has not yet started to inject premium packets onto the output link; and determining whether to accepting or reject a request for a premium service flow involving the output link based upon a total premium service bandwidth available on the output link, the measure of utilized premium service bandwidth on the output link and the request, the determining whether to accepting or reject the request comprises accepting the request when the following expression is true and rejecting the request when it is false:

$$req\_premium + used\_premium \leq \alpha \times total\_premium,$$

where, req_premium is the amount of premium service bandwidth specified in the request, used_premium is the current average premium service bandwidth utilization for the output link during the predetermined window of time plus the sum of the one or more bandwidth requests associated with flows that have been admitted but have not yet started to inject premium packets onto the output link, total_premium is the total amount of premium service bandwidth that is available for the output link, and $\alpha$ is a utilization parameter having a value greater than 0 and less than or equal to 1.

6. A method of making admission control decisions regarding premium unicast flows in a packet switched network without maintaining permanent per-flow state information for accepted unicast flows, the method comprising:

temporarily storing bandwidth request information associated with admitted unicast flows that have been admitted within a predetermined holding time interval;

calculating an average premium service bandwidth used during a predetermined window of time on an output link of a network device;

determining whether to accept or reject a request for a premium service flow involving the output link based upon the request, a total premium service bandwidth available on the output link, the average premium service bandwidth, and the bandwidth request information based on an expression:

$$req\_premium + used\_premium \leq \alpha \times total\_premium,$$

where, req_premium is the amount of premium service bandwidth specified in the request, used_premium is the current average premium service bandwidth utilization for the output link during the predetermined window of time plus the sum of the one or more bandwidth requests associated with flows that have been admitted but may not yet have started to inject premium packets onto the output link, total_premium is the total amount of premium service bandwidth that is available for the output link, and $\alpha$ is a utilization parameter having a value greater than 0 and less than or equal to 1.

7. A method of making admission control decisions in a Differentiated Services Packet Network, the method comprising:

periodically determining a measure of utilized premium service bandwidth on an output link of a network device based upon an average premium service bandwidth used during a predetermined window of time and requested bandwidth associated with at least one flow that has been admitted but that has not yet started to inject premium packets onto the output link;

receiving a request for premium service bandwidth over the output link; and determining whether to accepting or reject the request based upon a total premium service bandwidth available on the output link, the measure of utilized premium service bandwidth on the output link, and the request in accordance with an expression:

$$req\_premium + used\_premium \leq \alpha \times total\_premium,$$

where, req_premium is the amount of premium service bandwidth specified in the request, used_premium is the current average premium service bandwidth utilization for the output link during the predetermined window of time plus the sum of the one or more bandwidth requests associated with flows that have been admitted but may not yet have started to inject premium packets onto the output link, total_premium is the total amount of premium service bandwidth that is available for the output link, and $\alpha$ is a utilization parameter having a value greater than 0 and less than or equal to 1.

8. A method of managing multicast flows in a Differentiated Services Packet Network, the method comprising the steps of:

receiving a request for premium service bandwidth for a multicast flow;

identifying one or more output links of a multicast-capable network device that are part of the multicast flow;

forwarding the request onto those of the one or more output links that satisfy an admission criterion, the admission criterion comprises the following expression:

$$req\_premium + used\_premium \leq \alpha \times total\_premium,$$

where, req_premium is the amount of premium service bandwidth specified in the request, used_premium is the current average premium service bandwidth utilization for a particular output link during the predetermined window of time plus the sum of the one or more bandwidth requests associated with flows that have been admitted but may not yet have started to inject premium packets onto the particular output link, total_premium is the total amount of premium service bandwidth that is available for the particular output link, and $\alpha$ is a utilization parameter having a value greater than 0 and less than or equal to 1;

maintaining a link state for the multicast flow for each of the one or more output links, the link state indicating a current state of a state machine that determines the behavior of the multicast-capable network device; and forwarding packets that are part of the multicast flow according to the link states associated with the one or more output links.

9. The method of claim 8, wherein the state machine has an initial state to which all new multicast flows are initialized, a flow pending state in which the associated output link has satisfied the admission criterion and is waiting for an admission decision for the request from a branch of its downlink sub-tree, a flow established state in which the associated output link has received an indication that a branch of its downlink sub-tree has accepted the request, and a flow refresh state in which the associated output link has forwarded a repeated request and is waiting for an admission decision for the repeated request from a branch of its downlink sub-tree, and wherein the method further comprises:

forwarding data packets as best-effort traffic over those of the one or more output links having a link state associated with the initial state or the flow pending state; and forwarding data packets as premium service traffic over those of the one or more output links having a link state associated with the flow established state or the flow refresh state.

10. The method of claim 9, wherein the maintaining of the link state for each of the one or more output links comprises:

transitioning from the initial state to the flow pending state after determining that the output link satisfies the admission criterion;

transitioning from the flow pending state to the flow established state after receiving an admission decision on the output link;

transitioning from the flow established state to the flow refresh state after receiving a repeated request for the multicast flow.

11. The method of claim 10, wherein the maintaining of the link state for each of the one or more output links further comprises:

transitioning from the refresh state to the flow established state after receiving an admission decision on the output link;

transitioning from the refresh state to the flow pending state after receiving no admission derision on the output link for a first predetermined time interval;

transitioning from the flow pending state to the initial state after receiving no admission decision on the output link for a second predetermined time interval.

12. The method of claim 11, wherein the maintaining of the link state for each of the one or more output links further comprises:

remaining in the initial state after deter mining that the output link does not satisfy the admission criterion;

remaining in the flow pending state after receiving subsequent requests;

remaining in the flow established state after receiving subsequent admission decisions on the output link; and remaining in the flow refresh state after receiving subsequent requests.

13. The method of claim 10, further comprising:

in the initial state, after determining that the output link satisfies the admission criterion, forwarding the request on the output link and transitioning to the flow pending state;

in the flow pending state, after receiving an admission decision on the output link, forwarding the admission decision upstream and transitioning to the flow established state;

in the flow established state, after receiving a repeated request for the multicast flow, forwarding the repeated request onto each of the one or more output links and transitioning to the flow refresh state.

14. The method of claim 13, further comprising:

in the refresh state, after receiving an admission decision on the output link, forwarding the admission decision upstream and transitioning to the flow established state;

in the refresh state, after receiving no admission decision on the output link for a first predetermined time interval, transitioning to the flow pending state;

in the flow pending state, after receiving no admission decision on the output link for a second predetermined time interval, transitioning to the initial state.

15. The method of claim 14, wherein the maintaining of the link state for each of the one or more output links further comprises:

in the initial state, after determining that the output link does not satisfy the admission criterion, remaining in the initial state;

in the flow pending state, after receiving subsequent requests, forwarding the subsequent requests on the output link and remaining in the flow pending state;

in the flow established state, after receiving subsequent admission decisions on the output link, dropping the subsequent admission decisions and remaining in the flow established state; and in the flow refresh state, after receiving subsequent requests, forwarding the subsequent requests on the output link and remaining in the flow refresh state.

16. A network device comprising:

a storage device having stored therein one or more routines for implementing admission control policy based on local information;

a processor coupled to the storage device for executing the one or more routines to make an admission decision regarding a request for establishment of a flow, where:

an average premium service bandwidth utilized during a predetermined window of time is determined for an output link through which the flow will pass;

bandwidth request information associated with one or more flows that have been admitted within a predetermined time interval is temporarily stored; and an admission criterion is evaluated based upon a following expression:

$$\text{req\_premium} + \text{used premium} \leq \alpha \times \text{total\_premium},$$

where, req_premium is the amount of premium service bandwidth specified in the request, used_premium is the current average premium service bandwidth utilization for the output link during the predetermined window of time plus the sum of the one or more bandwidth requests associated with flows that have been admitted but may not yet have started to inject premium packets onto the output link, total_premium is the total amount of premium service bandwidth that is available for the output link, and $\alpha$ is a utilization parameter having a value greater than 0 and less than or equal to 1.

* * * * *